United States Patent
Stewart et al.

(10) Patent No.: US 11,443,541 B2
(45) Date of Patent: Sep. 13, 2022

(54) CLASSIFICATION OF PERSON TYPE IN A VISUAL MEDIUM

(71) Applicant: Sensormatic Electronics, LLC, Boca Raton, FL (US)

(72) Inventors: Michael C. Stewart, Delray Beach, FL (US); Joseph Celi, Boca Raton, FL (US); Gopi Subramanian, Delray Beach, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 196 days.

(21) Appl. No.: 17/006,468

(22) Filed: Aug. 28, 2020

(65) Prior Publication Data

US 2022/0067358 A1    Mar. 3, 2022

(51) Int. Cl.
*G06V 40/10* (2022.01)
*G06T 7/11* (2017.01)
(Continued)

(52) U.S. Cl.
CPC ......... *G06V 40/103* (2022.01); *G06K 9/6256* (2013.01); *G06K 9/6262* (2013.01);
(Continued)

(58) Field of Classification Search
CPC .. G06V 40/103; G06V 2201/09; G06V 20/52; G06K 9/6256; G06K 9/6262;
(Continued)

(56) References Cited

U.S. PATENT DOCUMENTS 9,218,364 B1 * 12/2015 Garrigues ............... G06F 16/50
10,169,680 B1 * 1/2019 Sachdeva ............... G06T 15/30
(Continued)

OTHER PUBLICATIONS

Dutta et al., "The VIA Annotation Software for Images, Audio and Video," MM '19: Proceedings of the 27th ACM International Conference on Multimedia, New York, Oct. 15, 2019, pp. 2276-2279.

(Continued)

*Primary Examiner* — Wesley J Tucker
(74) *Attorney, Agent, or Firm* — ArentFox Schiff LLP

(57) ABSTRACT

Disclosed herein are apparatuses and methods for classifying person type in a visual medium. The implementations include identifying a person in an image, generating a visual boundary around the identified person, and dividing the image into a plurality of image portions such that multiple images portions partially depict the identified person inside the visual boundary. The implementations include generating the divided image on a user interface that prompts a user to select each portion that at least partially depicts a person of a predetermined type. The implementations include receiving a selection of at least one portion. The implementations include generating, for a machine learning model and in response to determining that the selection comprises the identified person, a training input that comprises a training image and a tag indicating that the identified person is of the predetermined type. Additionally, the implementations include storing the training input in memory.

19 Claims, 7 Drawing Sheets

(51) Int. Cl.
    *G06N 20/10*     (2019.01)
    *G06K 9/62*     (2022.01)

(52) U.S. Cl.
    CPC ................ *G06N 20/10* (2019.01); *G06T 7/11* (2017.01); *G06T 2207/20081* (2013.01); *G06V 2201/09* (2022.01)

(58) Field of Classification Search
    CPC ........ G06K 9/6284; G06N 20/10; G06T 7/11; G06T 2207/20081
    See application file for complete search history.

(56) References Cited

U.S. PATENT DOCUMENTS

| | | | | |
|---|---|---|---|---|
| 11,024,043 | B1* | 6/2021 | Othman | G06V 40/174 |
| 2010/0210358 | A1* | 8/2010 | Csurka | A63F 13/655 463/31 |
| 2017/0270674 | A1* | 9/2017 | Shrivastava | G06T 11/60 |
| 2019/0332893 | A1* | 10/2019 | Roy Chowdhury | G06T 11/60 |
| 2019/0362186 | A1* | 11/2019 | Irshad | G06V 10/82 |
| 2020/0258023 | A1 | 8/2020 | Paolella et al. | |
| 2021/0042530 | A1* | 2/2021 | Kim | G06V 20/46 |
| 2021/0201661 | A1* | 7/2021 | Al Jazaery | G06N 3/08 |
| 2022/0067345 | A1* | 3/2022 | Subramanian | G06V 40/50 |

OTHER PUBLICATIONS

International Search Report and Written Opinion in PCT/US2021/071301, dated Aug. 12, 2021.

Marroquin et al., "WiseNET: An indoor multi-camera multi-space dataset with contextual information and annotations for people detection and tracking," Data in Brief, vol. 27, Oct. 16, 2019, Article 104654, pp. 1-14.

Russell et al., "LabelMe: A Database and Web-Based Tool for Image Annotation," International Journal of Computer Vision, vol. 77, Issue 1-3, Oct. 31, 2007, pp. 157-173.

Wang et al., "Using Deep Learning to Solve Google reCAPTCHA v2's Image Challenges," 2020 14th International Conference on Ubiquitous Information Management and Communication (IMCOM), IEEE, Jan. 3, 2020, pp. 1-5.

* cited by examiner

CLASSIFICATION OF PERSON TYPE IN A VISUAL MEDIUM

TECHNICAL FIELD

The described aspects relate to image classification systems.

BACKGROUND

Aspects of the present disclosure relate generally to image classification systems, and more particularly, to classifying person type in a visual medium.

Modern image classification systems are able to distinguish between various objects. For example, a machine learning model that is trained to distinguish between cats and dogs may successfully do so when provided with a sufficient training database of images. For an average user, however, the accessibility to set up custom image classification systems is limited—especially in niche situations.

For example, in the context of a workplace, suppose that an owner of a department store seeks to evaluate employee performance. The owner may set up a camera to detect when an employee enters the frame and monitor the employee's activity. Given that several customers may also be at the department store, it becomes important to distinguish between employees and non-employees. In this scenario, the owner cannot simply use an arbitrary employee image classification system because the system may be trained on a very different set of training images and/or may require a specific type of input image. In terms of setting up his/her own image classification system, generating a training database without knowing how many images are needed, the compatibility of the model, and the types of scenarios to capture is cumbersome even for a person who understands machine learning, let alone for a person who does not.

Accordingly, there exists a need for improvements in image classification systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for classifying person type in a visual medium, comprising identifying a person in an image using image classification. The method further includes generating, on the image, a visual boundary around the identified person. Additionally, the method further includes dividing the image into a plurality of image portions such that multiple images portions partially depict the identified person inside the visual boundary. Additionally, the method further includes generating, for display, the plurality of image portions on a user interface that prompts a user to select each portion, of the plurality of image portions, that at least partially depicts a person of a predetermined type. Additionally, the method further includes receiving a selection of at least one portion in the divided image via the user interface. Additionally, the method further includes generating, for a machine learning model and in response to determining that the selection comprises the identified person inside the visual boundary, a training input that comprises a training image depicting contents inside the visual boundary and a tag indicating that the identified person inside the visual boundary is of the predetermined type. Additionally, the method further includes storing the training input in memory.

Another example implementation includes an apparatus for classifying person type in a visual medium, comprising a memory and a processor in communication with the memory. The processor is configured to identify a person in an image using image classification. The processor is further configured to generate, on the image, a visual boundary around the identified person. Additionally, the processor is further configured to divide the image into a plurality of image portions such that multiple images portions partially depict the identified person inside the visual boundary. Additionally, the processor is further configured to generate, for display, the plurality of image portions on a user interface that prompts a user to select each portion, of the plurality of image portions, that at least partially depicts a person of a predetermined type. Additionally, the processor is further configured to receive a selection of at least one portion in the divided image via the user interface. Additionally, the processor is further configured to generate, for a machine learning model and in response to determining that the selection comprises the identified person inside the visual boundary, a training input that comprises a training image depicting contents inside the visual boundary and a tag indicating that the identified person inside the visual boundary is of the predetermined type. Additionally, the processor is further configured to store the training input in memory.

Another example implementation includes an apparatus for classifying person type in a visual medium, comprising means for identifying a person in an image using image classification. The apparatus further includes means for generating, on the image, a visual boundary around the identified person. Additionally, the apparatus further includes means for dividing the image into a plurality of image portions such that multiple images portions partially depict the identified person inside the visual boundary. Additionally, the apparatus further includes means for generating, for display, the plurality of image portions on a user interface that prompts a user to select each portion, of the plurality of image portions, that at least partially depicts a person of a predetermined type. Additionally, the apparatus further includes means for receiving a selection of at least one portion in the divided image via the user interface. Additionally, the apparatus further includes means for generating, for a machine learning model and in response to determining that the selection comprises the identified person inside the visual boundary, a training input that comprises a training image depicting contents inside the visual boundary and a tag indicating that the identified person inside the visual boundary is of the predetermined type. Additionally, the apparatus further includes means for storing the training input in memory.

Another example implementation includes a computer-readable medium for classifying person type in a visual medium, executable by a processor to identify a person in an image using image classification. The instructions are further executable to generate, on the image, a visual boundary around the identified person. Additionally, the instructions are further executable to divide the image into a plurality of image portions such that multiple images portions partially depict the identified person inside the visual boundary. Additionally, the instructions are further executable to generate, for display, the plurality of image portions on a user interface that prompts a user to select each portion, of the plurality of image portions, that at least partially depicts a person of a predetermined type. Additionally, the instructions are further executable to receive a selection of at least one portion in the divided image via the user interface. Additionally, the instructions are further executable to generate, for a machine learning model and in response to determining that the selection comprises the identified person inside the visual boundary, a training input that comprises a training image depicting contents inside the visual boundary and a tag indicating that the identified person inside the visual boundary is of the predetermined type. Additionally, the instructions are further executable to store the training input in memory.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods that allow users to immediately set up custom image classification systems, particularly for niche scenarios such as classifying a type of person in an image or video. For example, the apparatuses and methods enable a streamlined approach of generating, via a user interface, a training dataset of images for a person of any type, and implementing a machine learning model that can then classify persons based on the generated training dataset.

Figure 1:
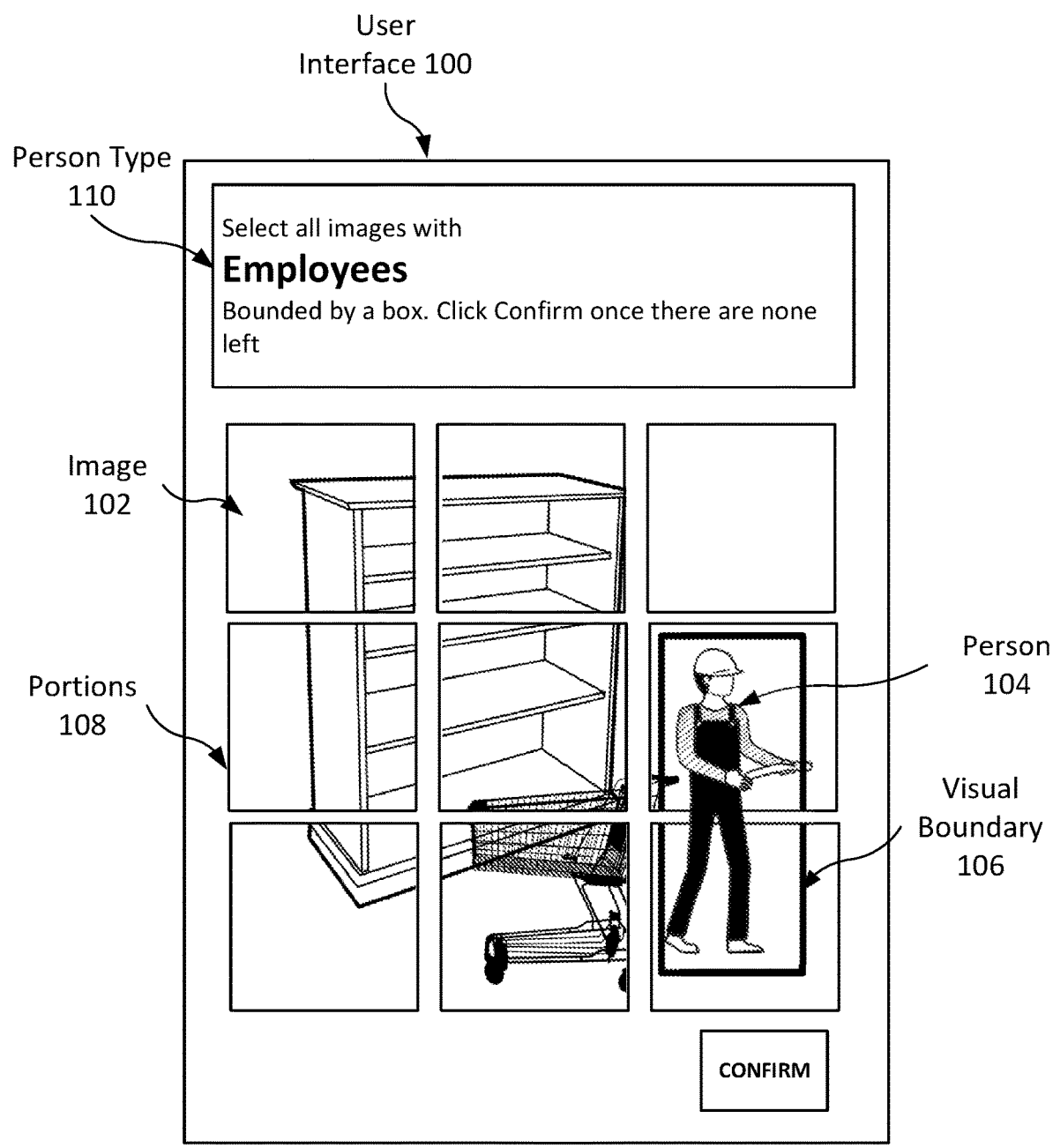
FIG. 1 is a diagram of a user interface utilized for classifying person type in a visual medium, in accordance with exemplary aspects of the present disclosure.

FIG. 1 is a diagram of user interface 100 utilized for classifying person type in a visual medium, in accordance with exemplary aspects of the present disclosure. User interface 100 provides an accessible approach to generate a training database for a custom image classification system, particularly one that classifies person type.

Figure 3:
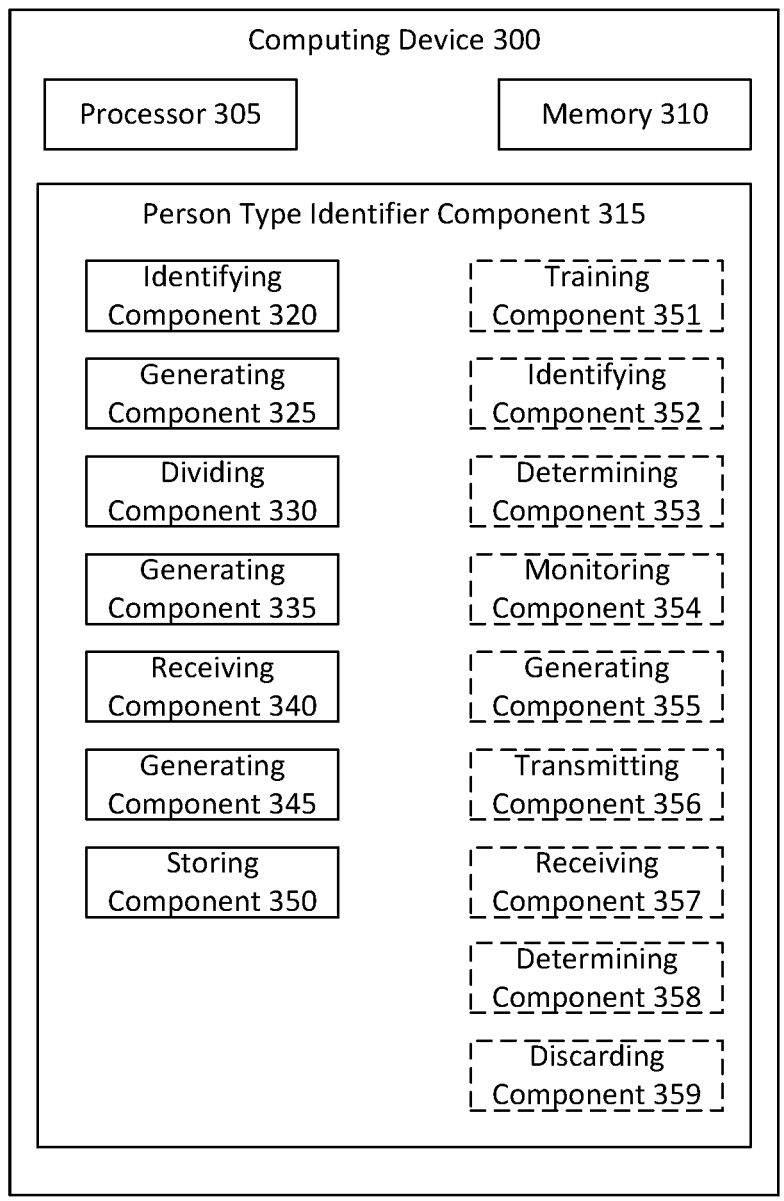
FIG. 3 is a block diagram of a computing device executing a person type identifier component, in accordance with exemplary aspects of the present disclosure.

Revisiting the example provided in the background of the present disclosure, an owner of a department store may set up a security camera that collects videos and images, and uploads them to a computing device (e.g., computing device 300 described in FIG. 3). In some aspects, the computing device may be an electronic device capable of processing images and communicating information to other computing devices (e.g., a server, a smartphone, a laptop, a desktop, etc.). The uploading process may be wireless (e.g., via Wi-Fi or Bluetooth) or wired (e.g., via an Ethernet cable). The computing device may determine whether a received image has a person (e.g., person 104) and in response to detecting person 104, may generate visual boundary 106 around person 104. The computing device may then divide image 102 into a plurality of portions 102 such that visual boundary 106 is split across multiple portions. In FIG. 1, visual boundary 106 is found in the bottom-right two portions.

Subsequently, the computing device may generate user interface 100 for display. The generating may be performed on a display of the computing device itself, or of a different computing device. For example, the computing device may be a server and the different computing device may be the smartphone of the owner. Having already classified person 104 as a human, the purpose of user interface 100 is to prompt the user to identify and select a sub-class of person 104. In this case, user interface 100 prompts the user to select all portions of the divided image 102 that depict a person of type 110 (i.e., an employee). It should be noted that an administrator of the computing device may change type 110. For example, type 110 may be changed to "customer," thus prompting users to identify non-employees.

Visual boundary 106 allows the user to easily identify points of interest such as person 104 in image 102. This visual accessibility is further enhanced by dividing visual boundary 106 and its contents (i.e., image of person 104) across multiple portions. A user is thus informed of the possible candidates in image 102 that can be employees. A person standing in the background of image 102 that is difficult to make out would therefore not be bounded, nor selected, and in turn, would not throw off a machine learning model learning from the provided input data. The computing device receives the user's selection of portions when the user selects "confirm" on user interface 100. For example, the user may select the two portions that comprise visual boundary 106. It should be noted that even if the user selects only one of the two portions, the computing device may still identify person 104 as an employee, given that visual boundary 106 spans two portions (i.e., the non-selected portion is automatically selected because the computing device recognizes person 104 is a human).

User interface 100 thus yields a training input that features the contents of visual boundary 106 and a tag indicating that person 104 is an employee. This training input can be used to train a machine learning model to distinguish between employees and non-employees. In some aspects, the machine learning model may be a one-class support vector machine (SVM). Thus, only one training input would be necessary to initiate a user's custom image classification system.

Figure 2:
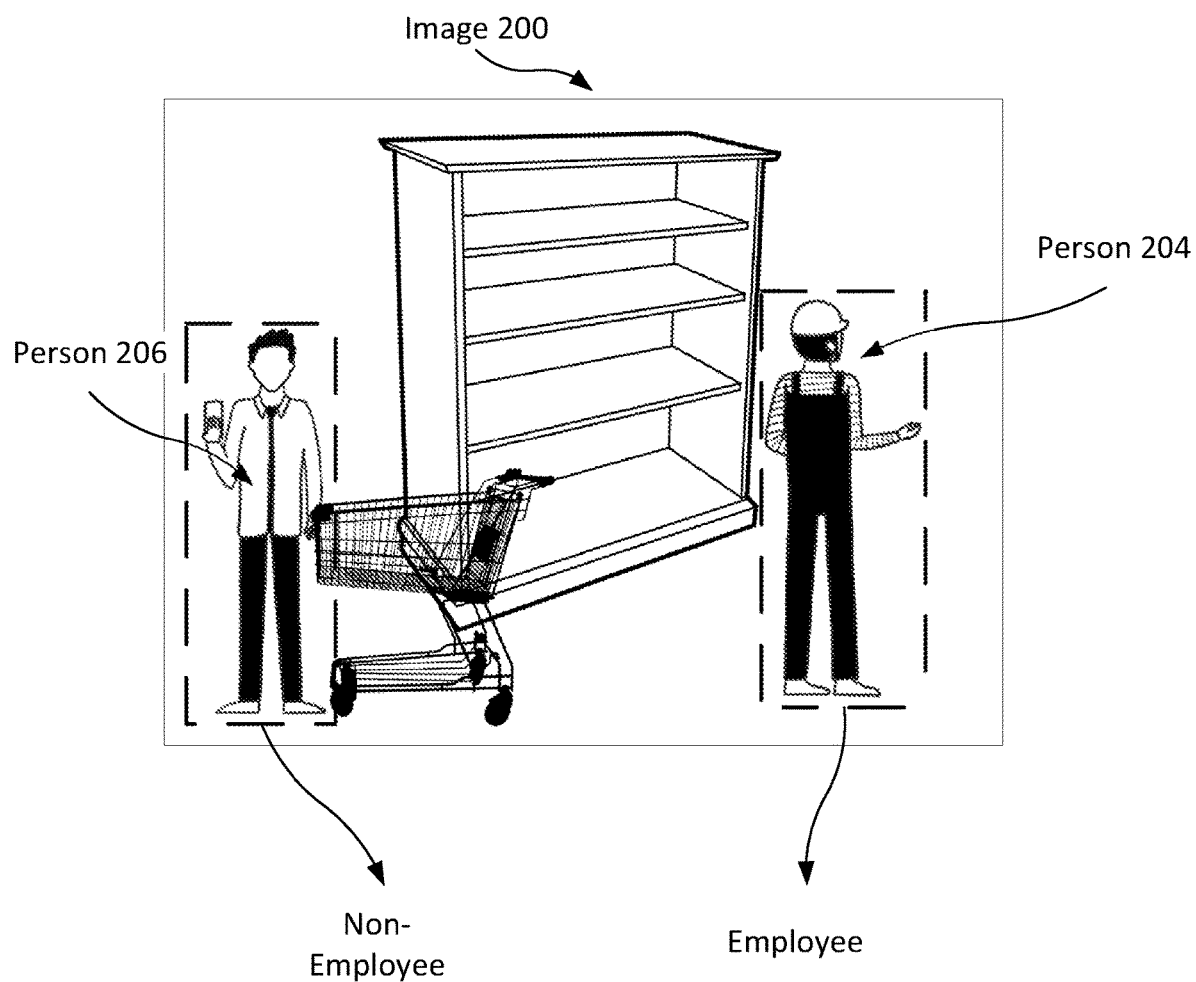
FIG. 2 is a diagram depicting persons in an image being classified based on type, in accordance with exemplary aspects of the present disclosure.

FIG. 2 is a diagram depicting persons in image 200 being classified based on type, in accordance with exemplary aspects of the present disclosure. Image 200 depicts a customer and an employee in a department store. Image 200 may be captured from the same security camera that captured image 102. In some aspects, image 200 may be captured from a different camera that can communicate with the computing device.

Suppose that image 200 is inputted into the trained machine learning model (e.g., the one-class SVM). Having known what an employee looks like based on the provided training input of person 104 (see FIG. 1), the trained machine learning model may determine that person 204 is an employee and person 206 is not an employee. Furthermore, the trained machine learning model may be retrained with both the original training input and the new image of person 204. This allows for the trained machine learning model to dynamically improve as more images of employees are made available and to adapt to employee uniform changes over time.

Figure 4:
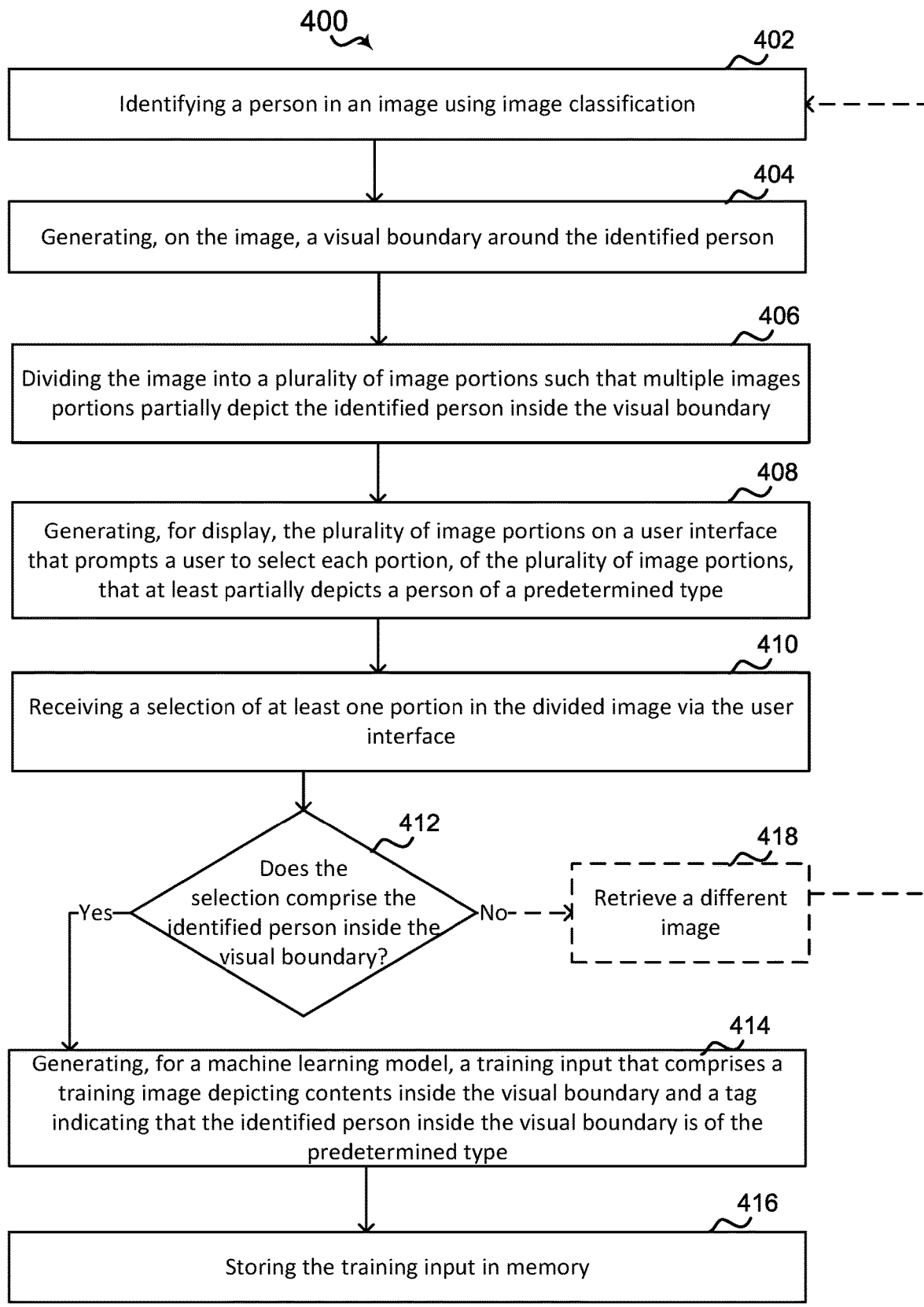
FIG. 4 is a flowchart illustrating a method of classifying person type in a visual medium, in accordance with exemplary aspects of the present disclosure.

FIG. 3 is a block diagram of computing device 300 executing a person type identifier component, in accordance with exemplary aspects of the present disclosure. FIG. 4 is a flowchart illustrating method 400 of classifying person type in a visual medium, in accordance with exemplary aspects of the present disclosure.

Referring to FIG. 3 and FIG. 4, in operation, computing device 300 may perform a method 400 of classifying person type in a visual medium via execution of person type identifier component 315 by processor 305 and/or memory 310.

At block 402, the method 400 includes identifying a person in an image using image classification. For example, in an aspect, computer device 300, processor 305, memory 310, person type identifier component 315, and/or identifying component 320 may be configured to or may comprise means for identifying a person in an image using image classification.

For example, the identifying at block 402 may include utilizing a pre-trained machine learning model or computer vision techniques to determine whether a frame in a video or a standalone image depicts a person. It should be noted that "person" is a class while "employee" and "non-employees" are sub-classes. The present aspects first classify a person, in general, utilizing any type of person classification model. One of the goals of the present disclosure is to provide a user with the ability to build a training database for a custom machine learning model. Because identifying component 320 automatically identifies a person, the user does not have to manually assess whether an image properly depicts a person for later classification into the sub-classes.

At block 404, the method 400 includes generating, on the image, a visual boundary around the identified person. For example, in an aspect, computer device 300, processor 305, memory 310, person type identifier component 315, and/or generating component 325 may be configured to or may comprise means for generating, on the image, a visual boundary around the identified person.

For example, the generating at block 404 may generate a shape, such as a rectangle, around person 104 in image 102. Generating component 325 may identify one or more boundaries of an image of a person, and then may create one or more boundary lines associated with such boundaries. For example, generating component 325 may attempt to generate the smallest visual boundary possible that fully outlines a body of the person 104. In some optional aspects, the ratio of the dimensions of the visual boundary may be constant for all identified persons (e.g., 3:6). This allows person type identifier component 315 to be a universal software that is compatible with any image. Suppose that the owner of the department store has two cameras set up. Both cameras may communicate with person type identifier component 315 and provide images such as image 102. One camera may be configured to capture 720 pixel images while the other camera may capture images in 4K. Despite the different resolutions, the training images of employees (which only include the pixels inside the visual body) generated by person type identifier component 315 will be the same ratio and can be scaled to the same size. This results in a consistent training database where all images are of the same aspect ratio and size.

At block 406, the method 400 includes dividing the image into a plurality of image portions such that multiple images portions partially depict the identified person inside the visual boundary. For example, in an aspect, computer device 300, processor 305, memory 310, person type identifier component 315, and/or dividing component 330 may be configured to or may comprise means for dividing the image into a plurality of image portions such that multiple images portions partially depict the identified person inside the visual boundary.

For example, the dividing at block 406 may include determining a size of image 102 and a size of visual boundary 106. In order to split contents of visual boundary 106 across multiple portions 108, dividing component 330 may determine dimensions of an individual portion that (1) the dimensions of image 102 are divisible by and (2) are smaller than the dimensions of visual boundary 106. For example, the dimensions of image 102 may be 1200×700 pixels and the dimensions of visual boundary 106 may be 300×600 pixels. Dividing component 330 determines a size that is less than 300 (the shortest length of visual boundary 106) and that 1200, 700, 600, and 300 are divisible by. In this particular example, dividing component 330 may divide image 102 into a plurality of portions that are each 100×100 pixels. It should be noted that this is merely an example. In some aspects, dividing component 330 may determine the largest size possible for the portion (that also meets the criteria discussed above) to reduce the number of selections that the user has to make.

At block 408, the method 400 includes generating, for display, the plurality of image portions on a user interface that prompts a user to select each portion, of the plurality of image portions, that at least partially depicts a person of a predetermined type. For example, in an aspect, computer device 300, processor 305, memory 310, person type identifier component 315, and/or generating component 335 may be configured to or may comprise means for generating, for display, the plurality of image portions on a user interface that prompts a user to select each portion, of the plurality of image portions, that at least partially depicts a person of a predetermined type.

For example, the generating at block 408 may include converting the data representing the image, image portions, and each boundary into a user interface 100 on a computing device. The computing device may be device 300 or any device that can communicate with device 300. As discussed previously, user interface 100 provides an accessible way for a user to quickly set up a custom image recognition system by enabling manual confirmation of whether person 104 is of person type 110.

At block 410, the method 400 includes receiving a selection of at least one portion in the divided image via the user interface. For example, in an aspect, computer device 300, processor 305, memory 310, person type identifier component 315, and/or receiving component 340 may be configured to or may comprise means for receiving a selection of at least one portion in the divided image via the user interface. Suppose that user interface 100 is generated on a touch screen smartphone. The user may select, via the touch screen, the two portions of image 102 that comprise visual boundary 106. In some aspects, user interface 100 may be generated on a desktop and that user may select the two portions using a mouse or keyboard inputs.

At block 412, the method 400 includes determining whether the selection comprises the identified person inside the visual boundary. For example, in an aspect, computer device 300, processor 305, memory 310, person type identifier component 315, and/or receiving component 340 may be configured to or may comprise means for determining whether the selection comprises the identified person inside the visual boundary.

For example, receiving component 340 may determine whether person 104 is depicted in at least one of the selected portions (i.e., are the pixels marked as making up the contents of visual boundary 106 included in the selected portions).

In response to determining that the selection includes the identified person, method 400 advances to block 414, where the method 400 includes generating, for a machine learning model, a training input that comprises a training image depicting contents inside the visual boundary and a tag indicating that the identified person inside the visual boundary is of the predetermined type. For example, in an aspect, computer device 300, processor 305, memory 310, person type identifier component 315, and/or generating component 345 may be configured to or may comprise means for generating, for a machine learning model, a training input that comprises a training image depicting contents inside the visual boundary and a tag indicating that the identified person inside the visual boundary is of the predetermined type.

In some aspects, the machine learning model is a one-class support vector machine. Accordingly, the model is trained on images depicting a single class of objects (e.g., images of persons of type 110) and simply determines whether any arbitrary image depicts persons of type 110 or not. The machine learning model may be configured to receive an input image and an input tag classifying the image, and generate a function (e.g., dot product with weights) that converts the input image to the input tag. This function is then applied to other images to determine new tags indicating whether the other images depict persons of person type 110 or not. In this case, generating component 345 recognizes that person 104 is of type 110 (e.g., an employee) and generates a training input comprising a cropped version of image 102 that only depicts the contents bounded by visual boundary 106 and a tag indicating that the cropped version of image 102 depicts an employee.

At block 416, the method 400 includes storing the training input in memory 310. For example, in an aspect, computer device 300, processor 305, memory 310, person type identifier component 315, and/or storing component 350 may be configured to or may comprise means for storing the training input in memory 310. Accordingly, person type identifier component 315 is able to build a training image database in memory 310.

If at block 412, person type identifier component 315 and/or receiving component 340 determines that the selection does not comprise the identified person, method 400 advances to block 418, where person type identifier component 315 retrieves a different image. For example, the user may not make a selection of any portion of image 102 (because no employees are shown), or may select a portion that person type identifier component 315 determines does not include a person based on its image classification system for identifying humans. In response, person type identifier component 315 generates a different image on user interface 100 for the user to interact with. More specifically, method 400 returns to block 402, where identifying component 320 identifies another person in a different image. The loop between block 402 and 418 may continue until the user closes user interface 100. In some aspects, subsequent to executing block 416, method 400 advances to 418 as well. This allows multiple training inputs to be saved in memory 310.

Figure 5:
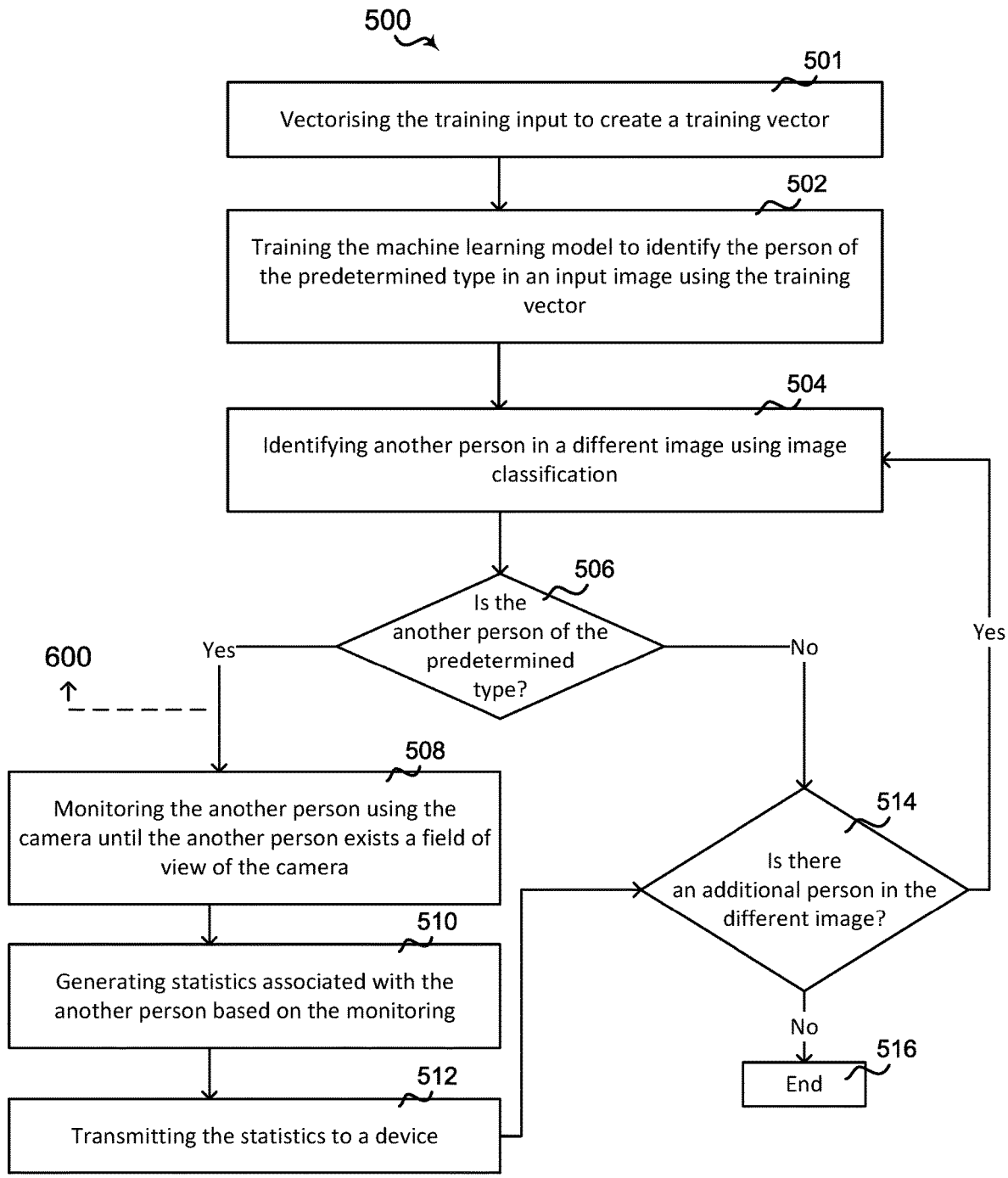
FIG. 5 is a flowchart illustrating a method of monitoring a person of a classified type, in accordance with exemplary aspects of the present disclosure.

FIG. 5 is a flowchart illustrating method 500 of monitoring a person of a classified type, in accordance with exemplary aspects of the present disclosure. In an optional aspect, method 500 may be performed after method 400 is complete. Referring to FIG. 5, at block 501, the method 500 may include vectorising the training input to create a training vector. For example, in an aspect, computer device 300, processor 305, memory 310, person type identifier component 315, and/or training component 351 may be configured to or may comprise means for vectorising the training input to create a training vector.

In an example where the predetermined type (i.e., type 110) is an "employee," vectorising the stored training input to create the training vector may include identifying at least one feature of the training input for inclusion in the training vector. For example, training component 351 may retrieve the training image from memory 310 and convert the matrix of pixels into a vector that mathematically represents select features of the training image. The at least one feature may be one or more of an outline of an employee uniform, a color representation of the employee uniform, a logo on the employee uniform, or presence of a nametag. For example, referring to FIG. 1, training component 351 may capture the dominant color in various regions of visual boundary 106 (e.g., a black uniform of person 104, a yellow hat on person 104, etc.), or may capture, via edge detection, the shape of the employee's uniform. The captured information representing the select features may be stored in a training vector (or any appropriate data structure) that a classifying function can be applied on. For simplicity, the classifying function may be a dot product between the training vector and a vector of learned weights. The result of the dot product may be a value such as 1 or −1 representing "employee" and "non-employee," respectively.

At block 502, the method 500 may include training the machine learning model to identify the person of the predetermined type in an input image using the training vector. For example, in an aspect, computer device 300, processor 305, memory 310, person type identifier component 315, and/or training component 351 may be configured to or may comprise means for training the machine learning model to identify the person of the predetermined type in an input image using the training vector.

For example, training component 351 may determine a vector of learned weights that result in a known output. Through user interface 100, training component 351 receives a tag indicating that the training input depicts an employee. If the sub-class "employee" is represented by the value "1," training component 351 learns a vector of weights that results in a dot product of 1 when applied on the training vector. This vector of weights is later used on new input images. It should be noted that the dot product is a simplified example of the function utilized in the machine learning model. One skilled in the art will appreciate that the function and method of reducing error (e.g., gradient descent) may differ based on the machine learning model used.

At block 504, the method 500 may further include identifying another person in a different image using image classification. For example, in an aspect, computer device 300, processor 305, memory 310, person type identifier component 315, and/or identifying component 352 may be configured to or may comprise means for identifying another person in a different image using image classification. For example, the identifying at block 504 may involve identifying person 204 of image 200.

At block 506, the method 360 may further include determining, using the machine learning model, whether the another person is of the predetermined type. For example, in an aspect, computer device 300, processor 305, memory 310, person type identifier component 315, and/or determining component 353 may be configured to or may comprise means for determining, using the machine learning model, whether the another person is of the predetermined type. For example, determining component 353 may generate a visual boundary around person 204, generate a cropped version of image 200 comprising only the contents of the visual boundary, vectorize the cropped version of image 200, and apply the classifying function using the vector of learned weights.

In response to determining that the another person is of the predetermined type (e.g., type 110), method 500 may advance to block 508, or may optionally advance to method 600.

At block 508, the method 500 may further include monitoring the another person using the camera until the another person exists a field of view of the camera. For example, in an aspect, computer device 300, processor 305, memory 310, person type identifier component 315, and/or monitoring component 354 may be configured to or may comprise means for monitoring, in response to determining that the another person is of the predetermined type, the another person using the camera until the another person exists a field of view of the camera.

For example, the monitoring at block 508 may include tracking where person 204 moves in the field of view of the security camera installed by the owner of the department store.

In this optional aspect, at block 510, the method 500 may further include generating statistics associated with the another person based on the monitoring. For example, in an aspect, computer device 300, processor 305, memory 310, person type identifier component 315, and/or generating component 355 may be configured to or may comprise means for generating statistics associated with the another person based on the monitoring.

For example, the generating at block 510 may include determining how long person 204 remains idle, how long person 204 is in the proximity of a non-employee such as person 206 (indicating customer interaction), the locations that person 204 most frequents in the environment, etc.

In this optional aspect, at block 512, the method 500 may further include transmitting the statistics to a device. For example, in an aspect, computer device 300, processor 305, memory 310, person type identifier component 315, and/or transmitting component 356 may be configured to or may comprise means for transmitting the statistics to a device.

For example, the transmitting at block 512 may include sending, e.g., from a modem or transmitter via a wired or wireless communication link, the various statistics to a device of the owner of the department store. This allows the owner to evaluate employee performance through an objective lens.

Suppose that at 506, determining component 353 determines that the another person is not of the predetermined type. In response, method 500 may advance to 514, where person type identifier component 315 and/or identifying component 352 may determine whether there is an additional person in the different image. For example, identifying component 352 may first identify person 206 and may determine that person 206 is not of type 110 (i.e., is a non-employee).

If it is determined that there is an additional person in the different image (e.g., person 204), method 500 returns to 504, where person type identifier component 315 and/or identifying component 352 identifies the additional person. Method 500 then proceeds in the loop between 504 and 514 until all persons in the different image (e.g., image 200) have been classified as either of or not of the predetermined type. When no additional persons are left in the different image, method 500 ends at 516. In the context of a video, person type identifier component 315 may determine whether a person of type 110 exists in every other select number of frames. For example, component 315 may evaluate every $300^{th}$ frame in a video that is 60 frames per second. The frame number can be adjusted by an administrator.

Figure 6:
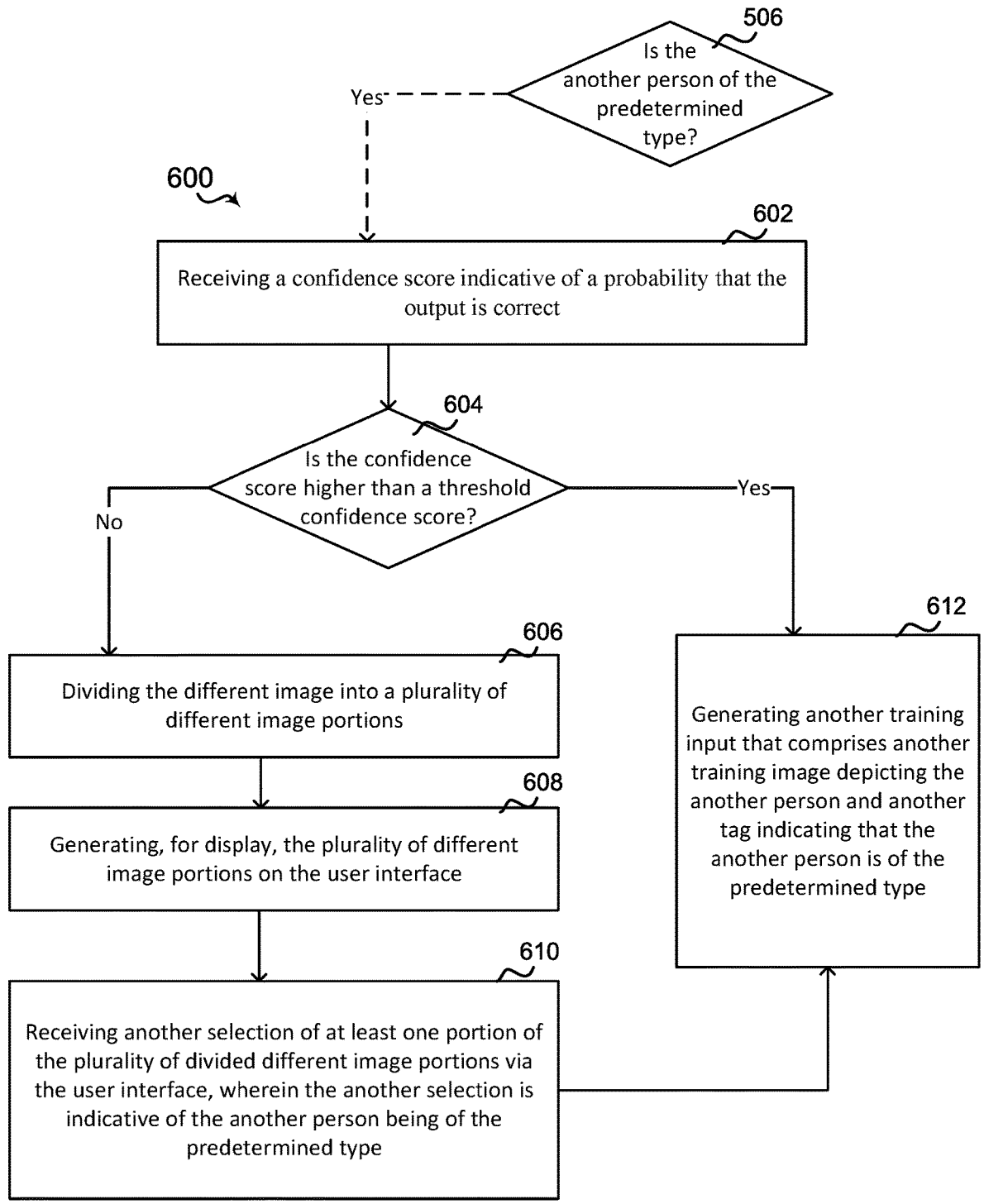
FIG. 6 is a flowchart illustrating a method of verifying a person type classification, in accordance with exemplary aspects of the present disclosure.

FIG. 6 is a flowchart illustrating method 600 of verifying a person type classification, in accordance with exemplary aspects of the present disclosure. This optional aspect may be implemented subsequent to determining that the another person is of the predetermined type in block 506 of method 500.

At block 602, the method 600 may include receiving a confidence score indicative of a probability that the output is correct. For example, in an aspect, computer device 300, processor 305, memory 310, person type identifier component 315, and/or receiving component 357 may be configured to or may comprise means for receiving a confidence score indicative of a probability that the output is correct.

For example, the machine learning model may output a probability (e.g., 60%) of being correct. In some scenarios, a non-employee may look very similar to an employee. For example, a non-employee may wear an outfit that is similar to an employee's uniform. To prevent incorrect classifications, a confidence score is outputted by the machine learning model that can be useful in determining whether more training is necessary. In some aspects, the confidence score is a numerical representation of the deviation between the training images used to train the machine learning model and the image of person being classified.

In this optional aspect, at block 604, the method 360 may further include determining whether the confidence score is higher than a threshold confidence score. For example, in an aspect, computer device 300, processor 305, memory 310, person type identifier component 315, and/or receiving component 357 may be configured to or may comprise means determining whether the confidence score is higher than a threshold confidence score.

For example, the threshold confidence score may be a configurable value, such as but not limited to 80%, set by an administrator. If a confidence score is lower than this value, the output may not be trustworthy. Thus, in response to determining that the confidence score is not higher than the threshold confidence score, person type identifier component 315 verifies the output from the machine learning model by implementing steps in blocks 606, 608, and 610.

In this optional aspect, at block 606, the method 600 may further include dividing the different image into a plurality of different image portions. For example, in an aspect, computer device 300, processor 305, memory 310, person type identifier component 315, and/or dividing component 330 may be configured to or may comprise means for dividing the different image into a plurality of different image portions.

As an example, and referring back to FIG. 2, the machine learning model may classify person 204 as an employee, but the associated confidence score may be 70%. This probability is determined based on the deviation between the training images used to train the machine learning model and the image of person 204. The deviation may be enough to guess that person 204 is not a non-employee, but may not be enough to fully confirm as such. Because the confidence score is less than the threshold confidence score of 80%, person type identifier component 315 utilizes the same method of generating training images for the machine learning model. For example, dividing component 330 may divide image 200 for presentation on user interface 100.

At block 608, the method 600 may further include generating, for display, the plurality of different image portions on the user interface. For example, in an aspect, computer device 300, processor 305, memory 310, person type identifier component 315, and/or generating component 335 may be configured to or may comprise means for generating, for display, the plurality of different image portions on user interface 100.

At block 610, the method 600 may further include receiving another selection of at least one portion of the plurality of divided different image portions via the user interface, wherein the another selection is indicative of the another person being of the predetermined type. For example, in an aspect, computer device 300, processor 305, memory 310, person type identifier component 315, and/or receiving component 340 may be configured to or may comprise means for receiving another selection of at least one portion of the plurality of divided different image portions (of image 200) via user interface 100, wherein the another selection is indicative of the another person (e.g., person 204) being of the predetermined type.

For example, a user may select portions of image 200 on user interface 100 that comprise person 204. Based on this confirmation that person 204 is indeed of type 110 (as also determined by the machine learning model), at block 612, the method 600 may further include generating, in response to determining that the another selection comprises the another person, another training input that comprises another training image depicting the another person and another tag indicating that the another person is of the predetermined type. For example, in an aspect, computer device 300, processor 305, memory 310, person type identifier component 315, and/or generating component 345 may be configured to or may comprise means for generating, in response to determining that the another selection comprises the another person, another training input that comprises another training image depicting the another person and another tag indicating that the another person is of the predetermined type.

In the event that the selection does not comprise person 204, person type identifier component 315 determines that the machine learning model misclassified. In this case, the another training input may still be generated, but the tag will indicate that the another person (i.e., person 204) is not of type 110. In this case, the machine learning model is retrained such that for this particular training input, the vector of learned weights yields−1 when the classifying function is applied and for all other training inputs depicting employees, the vector of learned weights yields 1.

If at block 604, person type identifier component 315 determines that the confidence score is higher than the threshold confidence score, person type identifier component 315 may not verify the output of the machine learning model and method 600 may advance directly to block 612 from block 604.

Figure 7:
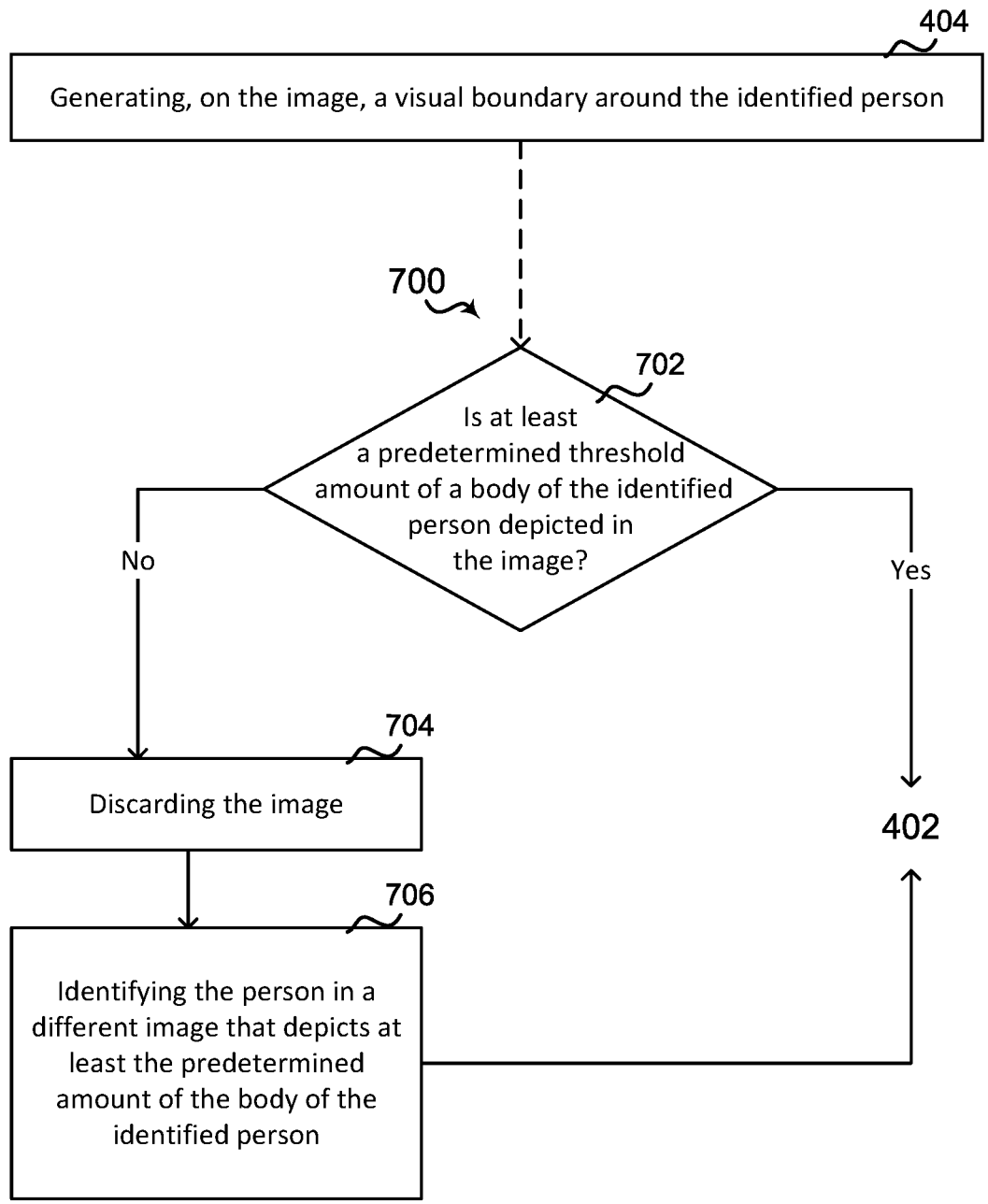
FIG. 7 is a flowchart illustrating a method of filtering potential training images based on person visibility, in accordance with exemplary aspects of the present disclosure.

FIG. 7 is a flowchart illustrating method 700 of filtering potential training images based on person visibility, in accordance with exemplary aspects of the present disclosure. This optional aspect may be implemented by person type identifier component 315 subsequent to implementing block 404 of method 400.

At block 702, the method 700 may further include determining whether at least a predetermined amount of a body of the identified person is depicted in the image. For example, in an aspect, computer device 300, processor 305, memory 310, person type identifier component 315, and/or determining component 358 may be configured to or may comprise means for determining, prior to dividing the image, whether at least a predetermined amount of a body of the identified person is depicted in the image.

For example, the determining at block 702 may include determining whether the arms, legs, torso, and head of a person are clearly visible in image. The predetermined amount may comprise at least one of the two arms, at least one of the two legs, a torso, and a head. If at least the predetermined amount is not adequately depicted (e.g., the body is out of frame, cropped, or is behind some obstruction), using the image to train the machine learning model may yield undesirable results. Method 700 enables person type identifier component 315 to filter good training images from poor ones.

If at block 702, person type identifier component 315 determines that at least the predetermined threshold amount of the body is not depicted (or is not visible), method 700 advances to 704. In this optional aspect, at block 704, the method 700 may further include discarding the image. For example, in an aspect, computer device 300, processor 305, memory 310, person type identifier component 315, and/or discarding component 359 may be configured to or may comprise means for discarding the image. This prevents the image from being used for training purposes. It should be noted that discarding, in the context of the present disclosure, means to remove from consideration as a training image. The image may not necessarily be deleted.

In this optional aspect, at block 706, the method 700 may further include identifying the person in a different image that depicts at least the predetermined amount of the body of the identified person. For example, in an aspect, computer device 300, processor 305, memory 310, person type identifier component 315, and/or identifying component 320 may be configured to or may comprise means for identifying the person in a different image that depicts at least the predetermined amount of the body of the identified person.

For example, the identifying at block 706 may include receiving a new image. The new image may be a subsequent frame in an input video. The discarded image may partially depict person 204 entering the frame, while the subsequent frame may depict person 204's entire body. Thus, the subsequent frame is used in block 402 to identify person 204 because at least the predetermined amount of person 204's body is shown.

Subsequent to implementing block 706, method 700 advances to block 402 of method 400. If at block 702, person type identifier component 315 determines that at least the predetermined threshold amount of the body is depicted (or is visible), method 700 also advances to block 402 of method 400. In this case, the image is usable for training purposes and does not have to be discarded.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for classifying person type in a visual medium, comprising:
   identifying a person in an image using image classification;
   generating, on the image, a visual boundary around the identified person;
   dividing the image into a plurality of image portions such that multiple images portions partially depict the identified person inside the visual boundary;
   generating, for display, the plurality of image portions on a user interface that prompts a user to select each portion, of the plurality of image portions, that at least partially depicts a person of a predetermined type;
   receiving a selection of at least one portion in the divided image via the user interface;
   generating, for a machine learning model and in response to determining that the selection comprises the identified person inside the visual boundary, a training input that comprises a training image depicting contents inside the visual boundary and a tag indicating that the identified person inside the visual boundary is of the predetermined type; and
   storing the training input in memory.

2. The method of claim 1, wherein the machine learning model is a one-class support vector machine.

3. The method of claim 1, further comprising:
   vectorising the training input to create a training vector;
   training the machine learning model to identify the person of the predetermined type in an input image using the training vector.

4. The method of claim 3, further comprising:
   identifying another person in a different image using image classification; and
   determining, using the machine learning model, whether the another person is of the predetermined type.

5. The method of claim 4, wherein the different image is captured by a camera, further comprising:
   monitoring, in response to determining that the another person is of the predetermined type, the another person using the camera until the another person exists a field of view of the camera;
   generating statistics associated with the another person based on the monitoring; and
   transmitting the statistics to a device.

6. The method of claim 4, further comprising:
   receiving an output from the machine learning model indicating that the another person is of the predetermined type; and
   verifying the output by:
      dividing the different image into a plurality of different image portions;
      generating, for display, the plurality of different image portions on the user interface;
      receiving another selection of at least one portion of the plurality of divided different image portions via the user interface, wherein the another selection is indicative of the another person being of the predetermined type; and
      generating, in response to determining that the another selection comprises the another person, another training input that comprises another training image depicting the another person and another tag indicating that the another person is of the predetermined type.

7. The method of claim 6, wherein the machine learning model further outputs a confidence score indicative of a probability that the output is correct, and wherein the verifying is performed in response to determining that the confidence score is below a threshold confidence score.

8. The method of claim 3, wherein the predetermined type is an employee, and wherein vectorising the stored training input to create the training vector further comprises:
   identifying at least one feature of the training input for inclusion in the training vector, wherein the at least one feature is one or more of:
      an outline of an employee uniform,
      a color representation of the employee uniform,
      a logo on the employee uniform, or
      presence of a nametag.

9. The method of claim 1, further comprising:
   determining, prior to dividing the image, whether at least a predetermined amount of a body of the identified person is depicted in the image;
   discarding the image in response to determining that at least the predetermined amount of the body is not depicted; and
   identifying the person in a different image that depicts at least the predetermined amount of the body of the identified person.

10. An apparatus for classifying person type in a visual medium, comprising:
    a memory; and
    a processor in communication with the memory and configured to:
       identify a person in an image using image classification;
       generate, on the image, a visual boundary around the identified person;
       divide the image into a plurality of image portions such that multiple images portions partially depict the identified person inside the visual boundary;
       generate, for display, the plurality of image portions on a user interface that prompts a user to select each portion, of the plurality of image portions, that at least partially depicts a person of a predetermined type;
       receive a selection of at least one portion in the divided image via the user interface;
       generate, for a machine learning model and in response to determine that the selection comprises the identified person inside the visual boundary, a training input that comprises a training image depicting contents inside the visual boundary and a tag indicating that the identified person inside the visual boundary is of the predetermined type; and store the training input in memory.

11. The apparatus of claim 10, wherein the machine learning model is a one-class support vector machine.

12. The apparatus of claim 10, wherein the processor is further configured to:

vectorising the training input to create a training vector;

train the machine learning model to identify the person of the predetermined type in an input image using the training vector.

13. The apparatus of claim 12, wherein the processor is further configured to:

identify another person in a different image using image classification; and determine, using the machine learning model, whether the another person is of the predetermined type.

14. The apparatus of claim 13, wherein the different image is captured by a camera, wherein the processor is further configured to:

monitor, in response to determine that the another person is of the predetermined type, the another person using the camera until the another person exists a field of view of the camera;

generate statistics associated with the another person based on the monitoring; and transmit the statistics to a device.

15. The apparatus of claim 13, wherein the processor is further configured to:

receive an output from the machine learning model indicating that the another person is of the predetermined type; and verify the output by:

dividing the different image into a plurality of different image portions;

generating, for display, the plurality of different image portions on the user interface;

receiving another selection of at least one portion of the plurality of divided different image portions via the user interface, wherein the another selection is indicative of the another person being of the predetermined type; and generating, in response to determine that the another selection comprises the another person, another training input that comprises another training image depicting the another person and another tag indicating that the another person is of the predetermined type.

16. The apparatus of claim 15, wherein the machine learning model further outputs a confidence score indicative of a probability that the output is correct, and wherein the verifying is performed in response to determine that the confidence score is below a threshold confidence score.

17. The apparatus of claim 12, wherein the predetermined type is an employee, and wherein vectorising the stored training input to create the training vector the processor is further configured to:

identify at least one feature of the training input for inclusion in the training vector, wherein the at least one feature is one or more of:

an outline of an employee uniform, a color representation of the employee uniform, a logo on the employee uniform, or presence of a nametag.

18. The apparatus of claim 10, wherein the processor is further configured to:

determine, prior to divide the image, whether at least a predetermined amount of a body of the identified person is depicted in the image;

discard the image in response to determine that at least the predetermined amount of the body is not depicted; and identify the person in a different image that depicts at least the predetermined amount of the body of the identified person.

19. A non-transitory computer readable medium for classifying person type in a visual medium, executable by a processor to:

identify a person in an image using image classification;

generate, on the image, a visual boundary around the identified person;

divide the image into a plurality of image portions such that multiple images portions partially depict the identified person inside the visual boundary;

generate, for display, the plurality of image portions on a user interface that prompts a user to select each portion, of the plurality of image portions, that at least partially depicts a person of a predetermined type;

receive a selection of at least one portion in the divided image via the user interface;

generate, for a machine learning model and in response to determine that the selection comprises the identified person inside the visual boundary, a training input that comprises a training image depicting contents inside the visual boundary and a tag indicating that the identified person inside the visual boundary is of the predetermined type; and store the training input in memory.

* * * * *